(12) United States Patent
Manwaring et al.

(10) Patent No.: US 7,229,096 B2
(45) Date of Patent: Jun. 12, 2007

(54) ADAPTIVE ENERGY ABSORBING SYSTEM USING PIN PULLERS

(75) Inventors: Marvin V. Manwaring, Clio, MI (US);
Richard K. Riefe, Saginaw, MI (US);
Ray G. Armstrong, Bay City, MI (US);
Lee M. Tinnin, Clio, MI (US);
Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 381 days.

(21) Appl. No.: 10/840,087

(22) Filed: May 6, 2004

(65) Prior Publication Data

US 2005/0248141 A1 Nov. 10, 2005

(51) Int. Cl.
*B62D 1/19* (2006.01)
(52) U.S. Cl. ........................................ 280/777
(58) Field of Classification Search ............. 280/777; 188/374
See application file for complete search history.

(56) References Cited

U.S. PATENT DOCUMENTS

| | | | | |
|---|---|---|---|---|
| 4,630,716 A * | 12/1986 | Faust | ............. | 188/371 |
| 4,968,058 A | 11/1990 | Jones | ............. | 280/777 |
| 5,295,712 A | 3/1994 | Omura | ............. | 280/777 |
| 5,482,320 A | 1/1996 | Passebecq | ............. | 280/777 |
| 5,507,521 A | 4/1996 | Steffens | ............. | 280/775 |
| 5,605,073 A | 2/1997 | Milton et al. | ............. | 74/492 |
| 5,669,634 A | 9/1997 | Heinzman et al. | ............. | 280/888 |
| 5,720,496 A | 2/1998 | Riefe et al. | ............. | 280/775 |
| 6,170,874 B1 | 1/2001 | Fosse | ............. | 280/777 |
| 6,189,929 B1 | 2/2001 | Struble et al. | ............. | 280/777 |
| 6,234,528 B1 | 5/2001 | Ben-Rhouma et al. | ............. | 280/777 |
| 6,322,103 B1 | 11/2001 | Li et al. | ............. | 280/777 |
| 6,367,840 B1 * | 4/2002 | Duval et al. | ............. | 280/777 |
| 6,467,987 B1 | 10/2002 | Larsen et al. | ............. | 403/321 |
| 6,652,002 B2 | 11/2003 | Li et al. | ............. | 280/777 |
| 6,769,715 B2 * | 8/2004 | Riefe et al. | ............. | 280/777 |
| 6,802,536 B2 * | 10/2004 | Li et al. | ............. | 280/777 |
| 2001/0035643 A1 | 11/2001 | Mueller | ............. | 280/806 |
| 2002/0020999 A1 | 2/2002 | Duval et al. | ............. | 280/777 |
| 2003/0122363 A1 | 7/2003 | Muller | ............. | 280/806 |
| 2005/0189757 A1 * | 9/2005 | Li et al. | ............. | 280/777 |

\* cited by examiner

*Primary Examiner*—Paul N. Dickson
*Assistant Examiner*—Laura B. Freedman
(74) *Attorney, Agent, or Firm*—Michael D. Smith

(57) ABSTRACT

The invention provides an apparatus for absorbing energy in a collapsible steering column of a vehicle. A portion of the apparatus is deformable in response to an excessive frontal impacting force to the steering column so that injury to the vehicle operator is reduced. The apparatus includes a first steering column member and a second steering column member connected to one another such that the first steering column member slides relative to the second steering column member. The apparatus also includes a first anvil associated with a said first steering column member and a second anvil associated with said second steering column member. The apparatus also includes an energy absorbing member having a first portion extending around and operable to be drawn over said first anvil and a second portion extending around and operable to be drawn over said second anvil.

17 Claims, 4 Drawing Sheets

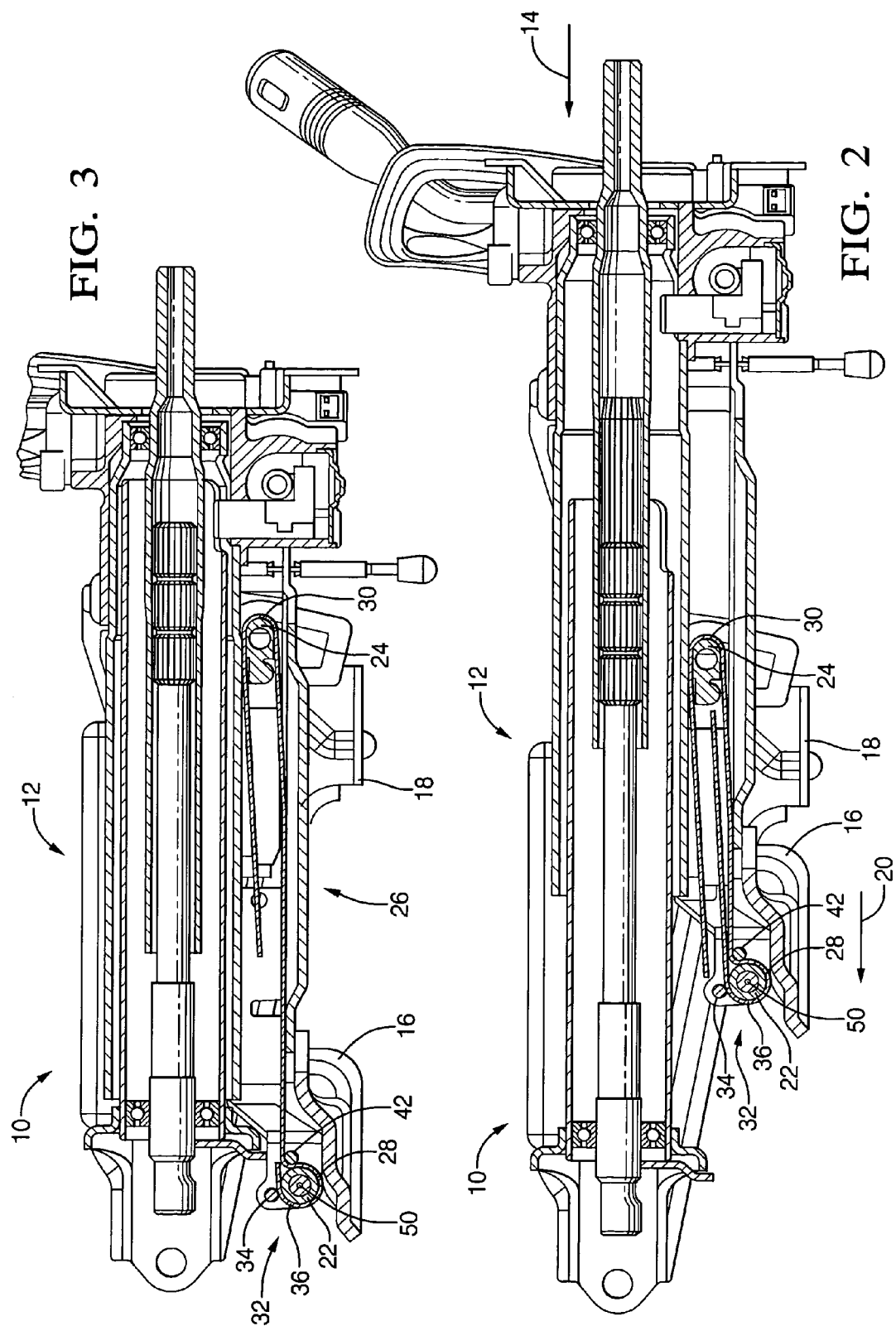

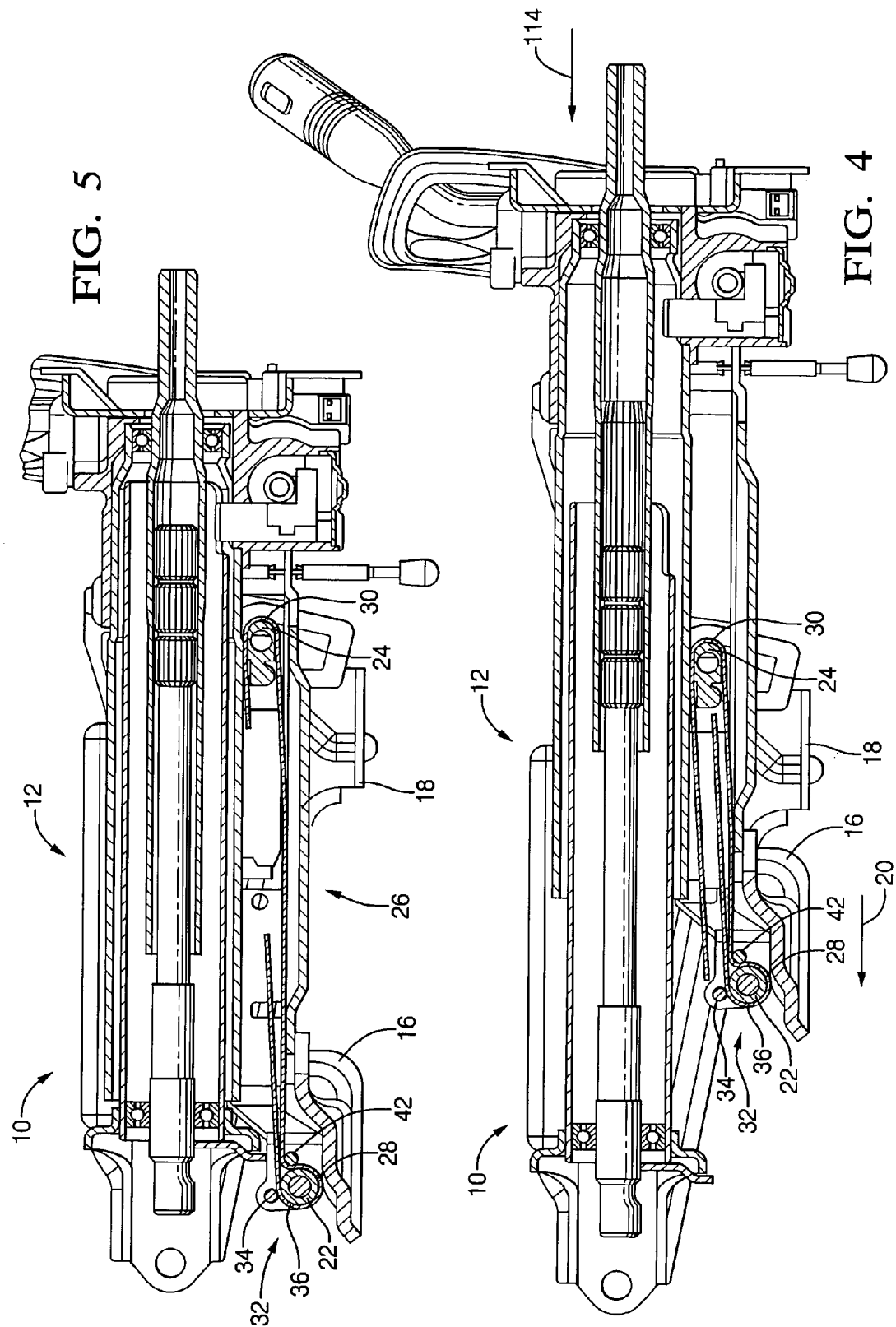

ADAPTIVE ENERGY ABSORBING SYSTEM USING PIN PULLERS

FIELD OF THE INVENTION

The invention relates to an energy absorber and more particularly to an energy absorbing apparatus for absorbing energy at different rates.

BACKGROUND OF THE INVENTION

Steering column assemblies for vehicles often include kinetic energy absorption devices that act to control the collapse of the column in the event of a crash to reduce the likelihood of injury to the driver. One form of an energy absorbing device comprises a metal strap that is bent and drawn over an anvil to absorb kinetic energy of a collapsing column. Examples of this type of energy absorbing device include U.S. Pat. Nos. 6,170,874; 6,189,929; 6,322,103; and 6,652,002.

SUMMARY OF THE INVENTION AND ADVANTAGES

The invention provides an apparatus for absorbing energy in a collapsible steering column of a vehicle. A portion of the apparatus is deformable in response to an excessive frontal impacting force to the steering column so that injury to the vehicle operator is reduced. The apparatus includes a first steering column member and a second steering column member connected to one another such that the first steering column member slides relative to the second steering column member. The apparatus also includes a first anvil associated with a said first steering column member and a second anvil associated with said second steering column member. The apparatus also includes an energy absorbing member having a first portion extending around and operable to be drawn over said first anvil and a second portion extending around and operable to be drawn over said second anvil.

The present invention provides the advantage of broadening the spectrum of accident parameters that may be used to improve the crashworthiness response of an energy-absorbing column. Furthermore, the invention provides a structure that has heretofore been impossible to use to vary the amount of resistance force to various inputs. The structure to vary the resistance force is an enhancement to the performance of the deformable member. The enhancement, for example, can provide a smaller amount of resistance in the case of a less severe collision or a lower weight occupant and a greater amount of resistance in the case of a more severe collision of a larger weight occupant.

BRIEF DESCRIPTION OF THE DRAWINGS

Other advantages of the present invention will be readily appreciated as the same becomes better understood by reference to the following detailed description when considered in connection with the accompanying drawings where:

FIG. 2 is a side, cross-sectional view of the first exemplary embodiment of the invention positioned in a steering column as a relatively low impacting force is applied to the steering column;

FIG. 3 is a side, cross-sectional view of the first exemplary embodiment disposed in the steering column after the relatively low impacting force has been applied to the steering column;

FIG. 4 is a side, cross-sectional view of the first exemplary embodiment disposed in the steering column as a relatively high impacting force is applied to the steering column;

FIG. 5 is a side, cross-sectional view of the first exemplary embodiment disposed in the steering column after the relatively high impacting force has been applied to a steering column;

DETAILED DESCRIPTION OF THE PREFERRED EMBODIMENT

Figure 1:
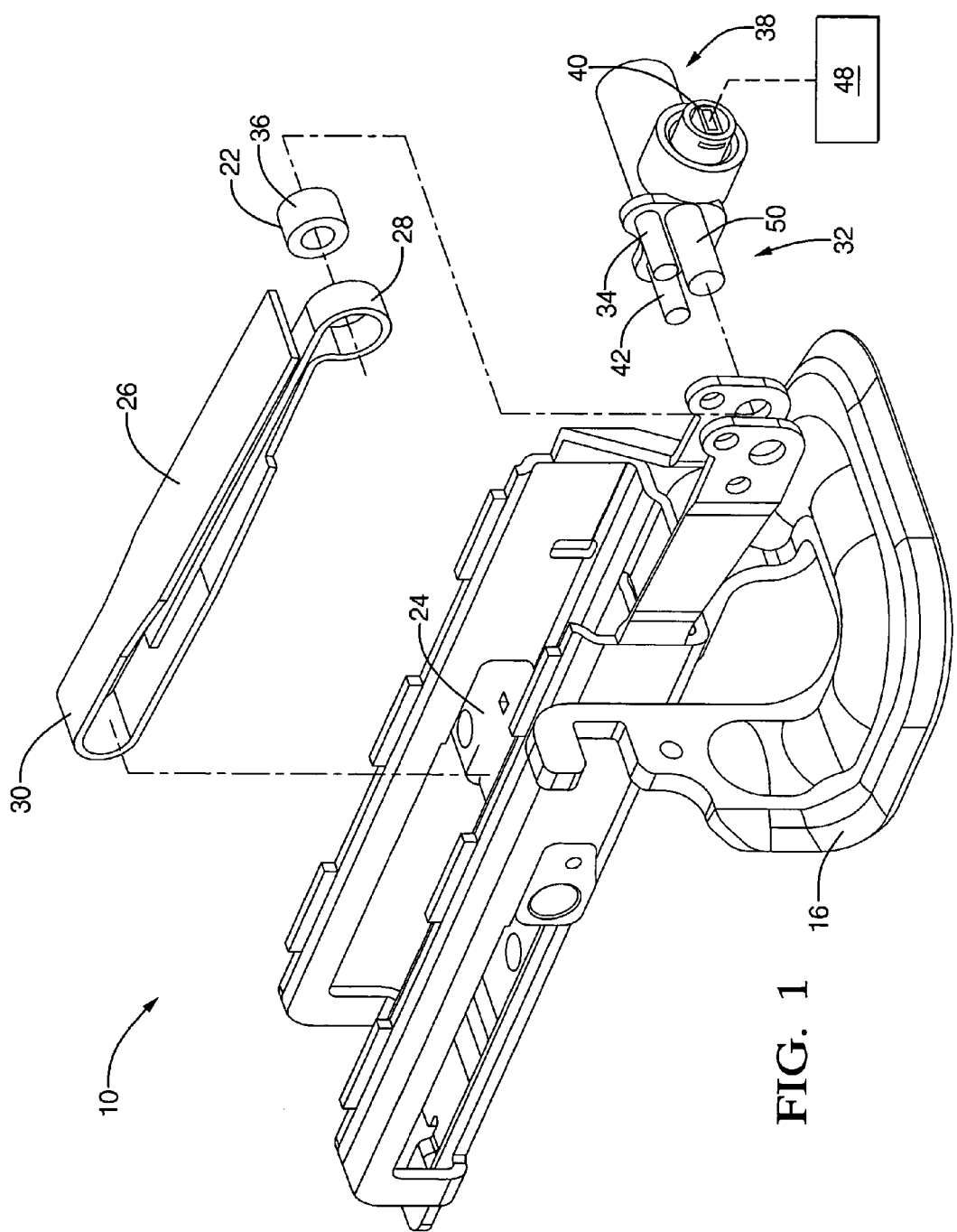
FIG. 1 is a perspective view of a first exemplary embodiment of the invention.

Referring now to FIGS. 1–5, the invention provides an apparatus 10 for absorbing energy in a collapsible steering column 12 of a vehicle. A portion of the apparatus 10 is deformable in response to an excessive frontal impacting force 14 to the steering column 12 so that injury to the vehicle operator is reduced. The apparatus 10 includes a first steering column member 16 and a second steering column member 18. One of the first and second steering column members 16, 18 is fixedly connected to the vehicle and the other is movably associated with the vehicle.

The first and second steering column members 16, 18 are connected to one another for sliding movement 20. In the exemplary embodiment of the invention, the second steering column member 18, is fixedly connected to the vehicle and the first steering column member 16 is slidably associated with the second steering column member 18 to move in the direction of sliding movement 20 in an impact situation.

The apparatus 10 also includes a first anvil 22 associated with the first steering column member 16 and a second anvil 24 associated with the second steering column member 18. The apparatus also includes an energy absorbing member 26 having a first portion 28 extending around an operable to be drawn over the first anvil 22. The energy absorbing member 26 also includes a second portion 30 extending around an operable to be drawn over the second anvil 24.

In operation, one of the first and second portions 28, 30 is drawn over the corresponding anvil 22, 24 in response to the severity or level of the frontal impacting force 14. For example, in the exemplary embodiment of the invention, a greater amount of energy dissipated when the second portion 30 of the energy absorbing member 26 is drawn over the second anvil 24 with respect to the amount of energy dissipated when the first portion 28 is drawn over the first anvil 22. If the level of frontal impacting force 14 is relatively high, the apparatus 10 responds by drawing the second portion 30 of the energy absorbing member 26 over the second anvil 24. Similarly, if the level of frontal impacting force 14 is relatively low, the apparatus 10 responds by drawing the first portion 28 of the energy absorbing member 26 over the first anvil 22.

The apparatus 10 also includes a locking device 32 associated with the energy absorbing member 26 to lock one of the first and second portions 28, 30 relative to the respective anvil 22, 24 in order to enhance the absorption of energy. In particular, as set forth above, the locking device 32 locks one of the first and second portions 28, 30 so that the energy absorbing member 26 absorbs energy at a desired rate. For example, if the locking device 32 is not engaged, the portion 28, 30 of the energy absorbing member 26 that dissipates less energy will be drawn over the corresponding anvil 22, 24 in response to the frontal impacting force 14 acting on the steering column 12. In other words, the energy absorbing member 26 will follow the path of least resistance. In the exemplary embodiment of the invention, the locking device 32 locks the first portion 28 relative to the first anvil 22 so that the higher rate of energy absorption associated with drawing the second portion 30 over the second anvil 24 is achieved.

The locking device 32 is responsive to a controller 48 that communicates with sensors (not shown). The sensors sense the severity of the frontal impacting force 14 and communicate sensed conditions to the controller 48. In response to the sensed conditions, the controller 48 selectively activates the locking device 32. The locking device 32 can be activated in response to a relatively high frontal impacting force 114 or can remain disengaged in response to a relatively low frontal impacting force 14. Also, the locking device 32 can be engaged after a predetermined length of the first portion 28 has been drawn over the first anvil 22 or immediately upon the application of the frontal impacting force 114 to the steering column 12.

In the first exemplary embodiment of the invention, the first anvil 22 is supported by a pin 50 that is releasably associated with the first steering column member 16. The locking device 32 includes a releasing device 38 operable to separate the anvil 22 from the steering column member 16. The releasing device 38 includes a pyrotechnic charge 40. When the pyrotechnic charge 40 is fired by the controller 48, the pin 50 is retracted from an interior aperture defined by the anvil 22.

The locking device 32 also includes a first surface 34 and a second surface 36 movably positioned with respect to one another. In the exemplary embodiment, the second surface 36 is defined by the anvil 22. The energy absorbing member 26 extends between the first and second surfaces 34, 36 and is selectively compressible between the first and second surfaces 34, 36. After the releasing device 38 fires the pyrotechnic charge 24 to retract the pin 50 and release the anvil 22, the energy absorbing member 26 moves the anvil 22, and the second surface 36, closer to the first surface 34 in response to the sliding movement 20 between the first and second steering column members 16, 18. Furthermore, the energy absorbing member 26 will be compressed between the first and second surfaces 34, 36 as the first and second surfaces 34, 36 are moved closer to one another in response to the sliding movement 20. The energy absorbing member 26 is compressed between the first and second surfaces 34, 36, increasing frictional resistance to movement of the first portion 28 of the energy absorbing member 26 relative to the first anvil 22.

The locking device 32 of the apparatus 10 also includes a third surface 42 fixedly spaced from the first surface 34. The third surface 42 is movably positioned with respect to the second surface 36. The energy absorbing member 26 extends between the third surface 42 and the second surface 36 so that the energy absorbing member 26 is selectively compressible between the third surface 42 and the second surface 36, similar to the compressive cooperation between the first and second surfaces 34, 36. Frictional resistance to movement is generated when the energy absorbing member 26 is compressed between the third surface 42 and the second surface 36 after the pin 50 is released by the releasing device 38. The third surface 42 and the first surface 34 are spaced a first distance from one another such that the anvil 22 is wider than the first distance.

Differentiation of the energy absorbing characteristics associated with drawing the first portion 28 over the first anvil 22 and associated with drawing the second portion 30 over the second anvil 24 can be achieved by forming the first and second portions 28, 30 differently with respect to one another. For example, the first and second portions 28, 30 can have different widths. Also, the first and second portions 28, 30 can have different thicknesses. Alternatively, the first and second anvils 22, 24 can be configured differently with respect to one another to differentiate the energy absorbing characteristics. For example, one of the first and second anvils 22, 24 can define an outer surface having a greater radius than a surface defined by the other of the first and second anvils 22, 24.

Figure 6:
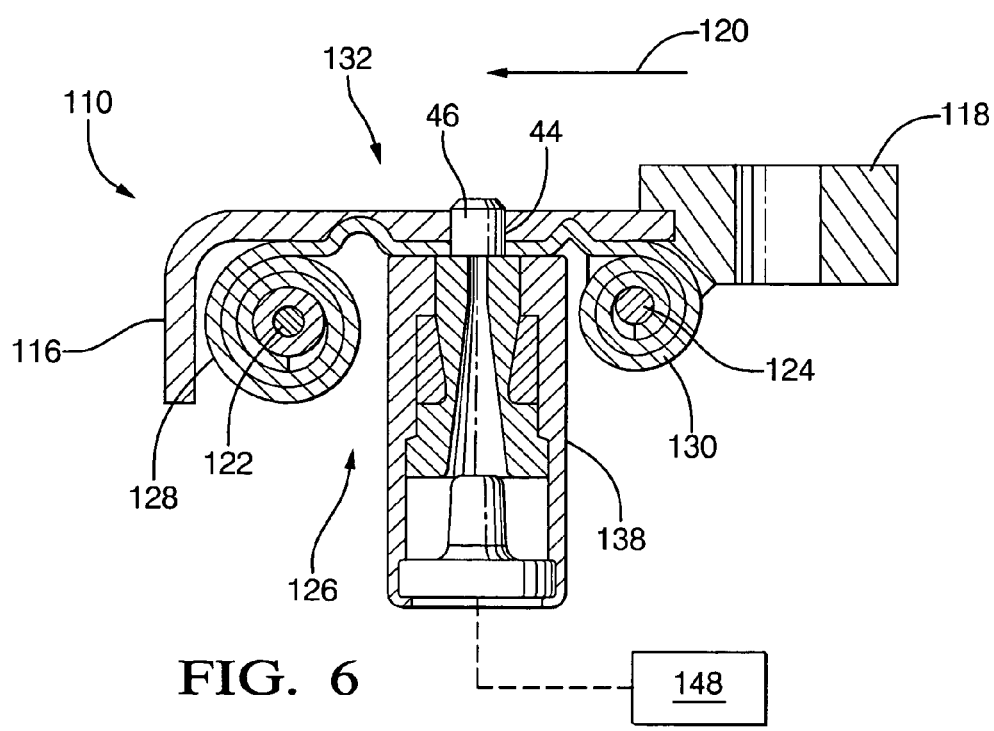
FIG. 6 is a side, cross-sectional view of a second exemplary embodiment of the invention.
Figure 7:
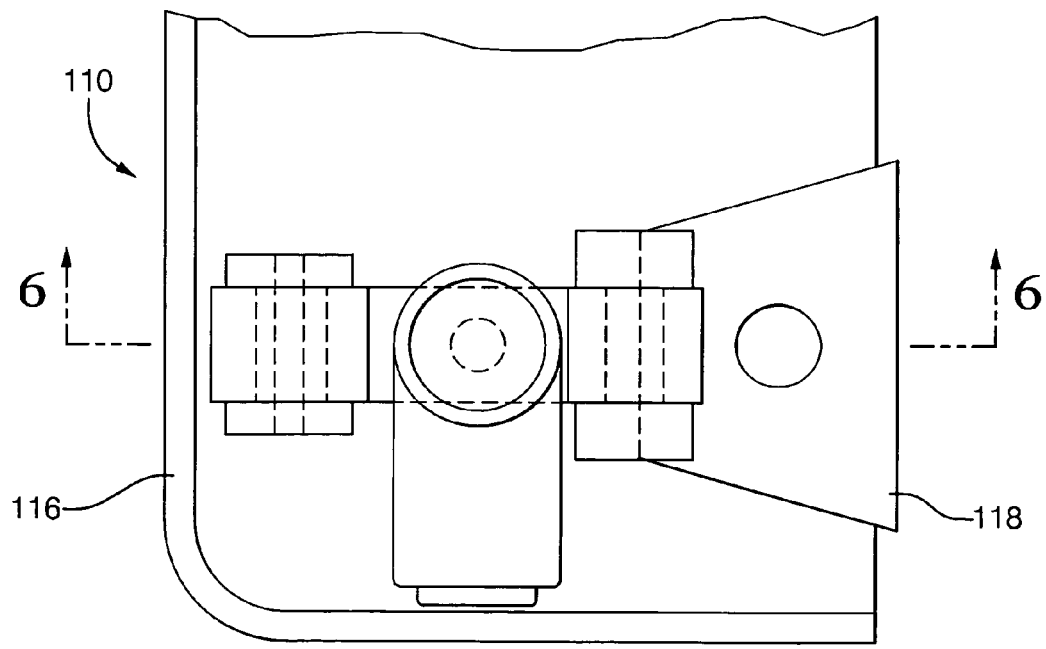
FIG. 7 is a top view of the second exemplary embodiment.

Referring now to FIGS. 6 and 7, an apparatus 110 according to a second exemplary embodiment of the invention includes a first steering column member 116 and a second steering column member 118 connected together for sliding movement 120. The first steering column member of the second exemplary embodiment is a bracket and second steering column member 118 is a capsule. The apparatus 110 also includes a first anvil 122 associated with the first steering column member 116 and a second anvil 124 associated with the second steering column member 118. An energy absorbing member 126 includes a first portion 128 extending around an operable to be drawn over the first anvil 122 and also includes a second portion 130 extending around an operable to be drawn over the second anvil 124. The energy absorbing member 126 absorbs energy at a first rate as the first portion 128 is drawn over the first anvil 122 and absorbs energy at a second rate as the second portion 130 is drawn over the second anvil 124. The first rate is lower than the second rate because the first anvil 122 defines a greater radius than the second anvil 124.

A locking device 132 is associated with the energy absorbing member 126 to lock the first portion 128 relative to the first anvil 122. The locking device 132 includes an aperture 44 defined by the energy absorbing member 126. The locking device 132 also includes a pin 46 insertable in the aperture 44. The apparatus 110 is biased in a locked position. In other words, the locking device 132 is engaged prior to the application of an impacting force to the steering column and the second portion 130 will be drawn over the second anvil 124 in response to the sliding movement 120.

A controller 148 communicates with sensors (not shown) that can sense the application and severity of an impacting force. In response to sensed conditions, the controller 148 controls a releasing device 138 to move the pin 46 from engagement with the aperture 44. In response to the retraction of the pin 46 from the aperture 44, the first portion 128 of the energy absorbing member 126 will be drawn over the first anvil 122.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for absorbing energy in a collapsible steering column of a vehicle by being deformable in response to an excessive frontal impacting force to the steering column so that injury to a vehicle operator is reduced comprising:
   a first steering column member;
   a second steering column member connected to said first steering column member for sliding movement;
   a first anvil associated with a said first steering column member;
   a second anvil associated with said second steering column member;
   an energy absorbing member having a first portion extending around and operable to be drawn over said first anvil and a second portion extending around and operable to be drawn over said second anvil; and
   a locking device associated with said energy absorbing member and movable between a locked position locking one of said first and second anvils against an associated portion of said energy absorbing member for preventing said energy absorbing member from being drawn over said locked anvil and a released position separating one of said first and second anvils from an associated steering column member for allowing said energy absorbing member to be drawn over said separated anvil.

2. The apparatus of claim 1 wherein said energy absorbing member absorbs energy at a first rate as said first portion is drawn over said first anvil and absorbs energy at a second rate as said second portion is drawn over said second anvil, said first and second rates being different from one another.

3. The apparatus of claim 2 wherein said one of said first and second portions locked by said locking device relative to said respective anvil conesponds to a lower of said first and second rates.

4. The apparatus of claim 1 wherein said locking device includes a first surface and a second surface movably positioned with respect to one another and wherein said energy absorbing member extends between said first and second surfaces so that said energy absorbing member is selectively compressible between said first and second surfaces to generate frictional resistance to movement of said energy absorbing member relative to said first and second surfaces.

5. The apparatus of claim 4 wherein one of said first and second surfaces is defined by one of said first and second anvils.

6. The apparatus of claim 5 wherein said locking device includes a releasing device operable to separate said one anvil from the respective steering column member and, after said releasing device releases said one anvil, said energy absorbing member moves said one anvil closer to the other of said first and second surfaces in response to said sliding movement to compress said energy absorbing member between said first and second surfaces.

7. The apparatus of claim 6 wherein said releasing device includes a pyrotechnic charge.

8. The apparatus of claim 6 wherein said locking device includes a third surface fixedly spaced from said other surface and movably positioned with respect to said one surface wherein said energy absorbing member extends between said third surface and said one surface so that said energy absorbing member is selectively compressible between said third surface and said one surface to generate frictional resistance to movement of said energy absorbing member relative to said third surface and said one surface.

9. The apparatus of claim 8 wherein said other surface and said third surface are spaced a first distance from one another and said one anvil being wider than said first distance.

10. The apparatus of claim 1 wherein said energy absorbing member defines an aperture and said locking device includes a pin inserted releasably in said aperture.

11. An apparatus for absorbing energy in a collapsible steering column of a vehicle by being deformable in response to an excessive frontal impacting force to the steering column so that injury to a vehicle operator is reduced comprising:
    a first steering column member;
    a second steering column member connected to said first steering column member for sliding movement;
    a first anvil associated with a said first steering column member;
    a second anvil associated with said second steering column member;
    an energy absorbing member having a first portion extending around and operable to be drawn over said first anvil and a second portion extending around and operable to be drawn over said second anvil wherein said energy absorbing member absorbs energy at a first rate as said first portion is drawn over said first anvil and absorbs energy at a second rate as said second portion is drawn over said second anvil, said first rate being lower than said second rate; and
    a locking device associated with said energy absorbing member and movable between a locked position locking said first anvil to said first portion for preventing said energy absorbing member from being drawn over said first anvil while allowing said second portion to be drawn over said second anvil and a released position separating said first anvil from said first steering column member for allowing said energy absorbing member to be drawn over said first anvil.

12. The apparatus of claim 11 wherein said locking device includes a first surface and a second surface movably positioned with respect to one another and wherein said energy absorbing member extends between said first and second surfaces so that said energy absorbing member is selectively compressible between said first and second surfaces to generate frictional resistance to movement of said energy absorbing member relative to said first and second surfaces and wherein said first surface is defined by said first anvil.

13. The apparatus of claim 12 wherein said locking device includes a releasing device operable to separate said first anvil from said first steering column member and, after said releasing device releases said first anvil, said energy absorbing member moves said first anvil closer to said second surface in response to said sliding movement to compress said energy absorbing member between said first and second surfaces.

14. The apparatus of claim 13 wherein said locking device includes a third surface fixedly spaced from said second surface and movably positioned with respect to said first surface and wherein said energy absorbing member extends between said second surface and said third surface so that said energy absorbing member is selectively compressible between said second and said third surfaces to generate frictional resistance to movement of said energy absorbing member relative to said second and said third surface.

15. The apparatus of claim 14 wherein said first and third surfaces are spaced a first distance from one another and said first anvil being wider than said first distance.

16. The apparatus of claim 11 wherein said first portion and said second portion have different widths.

17. An apparatus for absorbing energy in a collapsible steering column of a vehicle by being deformable in response to an excessive frontal impacting force to the steering column so that injury to a vehicle operator is reduced comprising:

a first steering column member;

a second steering column member connected to said first steering column member for sliding movement;

a first anvil associated with a said first steering column member;

a second anvil associated with said second steering column member;

an energy absorbing member having a first portion extending around and operable to be drawn over said first anvil and a second portion extending around and operable to be drawn over said second anvil wherein said energy absorbing member absorbs energy at a first rate as said first portion is drawn over said first anvil and absorbs energy at a second rate as said second portion is drawn over said second anvil, said first rate being lower than said second rate;

a locking device associated with said energy absorbing member to lock said first portion relative to said first anvil; and wherein said energy absorbing member defines an aperture and said locking device includes a pin inserted releasably in said aperture.

* * * * *